US012315141B2

(12) United States Patent
Alizad et al.

(10) Patent No.: US 12,315,141 B2
(45) Date of Patent: May 27, 2025

(54) SYSTEMS AND METHODS FOR QUANTIFYING VESSEL FEATURES IN ULTRASOUND DOPPLER IMAGES

(71) Applicant: Mayo Foundation for Medical Education and Research, Rochester, MN (US)

(72) Inventors: Azra Alizad, Rochester, MN (US); Mahdi Bayad, Cleveland, OH (US); Mostafa Fatemi, Rochester, MN (US); Seyed Siavash Ghavami Roudsari, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 598 days.

(21) Appl. No.: 17/299,907

(22) PCT Filed: Dec. 9, 2019

(86) PCT No.: PCT/US2019/065219
§ 371 (c)(1),
(2) Date: Jun. 4, 2021

(87) PCT Pub. No.: WO2020/118296
PCT Pub. Date: Jun. 11, 2020

(65) Prior Publication Data
US 2022/0028067 A1    Jan. 27, 2022

Related U.S. Application Data

(60) Provisional application No. 62/776,955, filed on Dec. 7, 2018.

(51) Int. Cl.
G06T 7/00 (2017.01)
G06T 7/11 (2017.01)

(52) U.S. Cl.
CPC .............. *G06T 7/0012* (2013.01); *G06T 7/11* (2017.01); *G06T 2200/24* (2013.01);
(Continued)

(58) Field of Classification Search
CPC .................... G06T 7/0012; G06T 7/11; G06T 2207/10136; G06T 2207/10132;
(Continued)

(56) References Cited

U.S. PATENT DOCUMENTS 5,709,209 A    1/1998  Friemel et al.
8,542,903 B2   9/2013  Shekhara
(Continued)

FOREIGN PATENT DOCUMENTS

KR      20200061874 A   *   6/2020

OTHER PUBLICATIONS

Miri et al. "Retinal image analysis using curvelet Transform and multistructure elements morphology by reconstruction"; IEEE. (Year: 2011).*

(Continued)

*Primary Examiner* — Shaghayegh Azima
(74) *Attorney, Agent, or Firm* — Quarles & Brady LLP

(57) ABSTRACT

Described here are systems and methods for quantifying vessel features in non-contrast microvasculature images obtained with an ultrasound imaging system. Vessel features that are quantified include, but are not limited to, vessel structure features (e.g., number of vessels, vessel density, number of branch points), vessel diameter, and vessel tortuosity. Morphological filtering is used to generate vessel segments from which the quantitative vessel features can be reliably quantified.

19 Claims, 7 Drawing Sheets

(52) U.S. Cl.
CPC .............. *G06T 2207/10136* (2013.01); *G06T 2207/20036* (2013.01); *G06T 2207/30101* (2013.01)

(58) Field of Classification Search
CPC . G06T 2207/20036; G06T 2207/30101; G06T 2200/24

See application file for complete search history.

(56) References Cited

U.S. PATENT DOCUMENTS

| | | | |
|---|---|---|---|
| 8,934,690 | B2 | 1/2015 | Mohamed |
| 9,017,263 | B2 | 4/2015 | Lerman et al. |
| 9,679,389 | B2 | 6/2017 | Ostrovsky-Berman et al. |
| 9,734,584 | B2 | 8/2017 | Frinking |
| 9,977,869 | B2 * | 5/2018 | Lavi ................. A61B 5/1075 |
| 10,117,597 | B2 * | 11/2018 | Beckers ................ G16Z 99/00 |
| 12,231,789 | B1 * | 2/2025 | Gipson ................ H04N 23/76 |
| 2003/0095696 | A1 * | 5/2003 | Reeves .................. G06T 7/155 382/173 |
| 2015/0164478 | A1 | 6/2015 | Samsung |
| 2016/0000368 | A1 * | 1/2016 | Wang .................. A61B 5/0062 600/425 |
| 2016/0135683 | A1 * | 5/2016 | Yasuno ................ A61B 3/0025 351/246 |
| 2020/0196984 | A1 * | 6/2020 | Sprung ..................... G06T 7/10 |
| 2022/0067933 | A1 * | 3/2022 | Alizad ..................... G06T 7/73 |

OTHER PUBLICATIONS

Bankhead et al; "Fast Retinal Vessel Detection and Measurement Using Wavelets and Edge Location Refinement"; PLOS One. (Year: 2012).*

Zhao et al.; "Multiscale Vascular Enhancement Filter Applied to In Vivo Morphologic and Functional Photoacoustic Imaging of Rat Ocular Vasculature," in IEEE Photonics Journal, Dec. 2019.*

Chang et al.; "Vascular morphology and tortuosity analysis of breast tumor inside and outside contour by 3-D power doppler ultrasound"; Elsevier; (Year: 2012).*

Huang et al. "Analysis of Tumor Vascularity Using Three-Dimensional Power Doppler Ultrasound Images" IEEE (Year: 2008).*

Phan T.H. Truc et al.; "Vessel enhancement filter using directional filter bank,"; Computer Vision and Image Understanding (Year: 2009).*

Bayat, M., et al., "Background Removal and Vessel Filtering of Non-Contrast Ultrasound Images of Microvasculature," IEEE Trans. On Biomedical Eng. (2018) 1-1 pp. 1-12.

Boskamp, T., et al., "New Vessel Analysis Tool for Morphometric Quantification and Visualization of Vessels in CT and MR Imaging Data Sets." RadioGraphics (2004) 24(1), 287-297. doi:10.1148/rg.241035073.

Chang, Y.C., et al., "Vascular Morphology and Tortuosity Analysis of Breast Tumor Inside and Outside Contour by 3-D Power Doppler Ultrasound," Ultrasound in Medicine and Biology (2012) vol. 38, No. 11, pp. 1859-1869.

Cohen, E.,et al., "An Isotropic Minimal Path Based Framework for Segmentation and Quantification of Vascular Networks" Pelillo, M., Hancock, E. (eds) Energy Minimization Methods in Computer Vision and Pattern Recognition. EMMCVPR 2017. Lecture Notes in Computer Science( ), vol. 10746. Cham. (2018).

Fraz, M. M., et al., "Blood vessel segmentation methodologies in retinal images—A survey." Computer Methods and Programs in Biomedicine (2012) 108(1), 407-433 doi:https://doi.org/10.1016/j.cmpb.2012.03.009.

Gessner, R.C., et al., "Blood Vessel Structural Morphology Derived from 3D Dual-Frequency Ultrasound Images" Ultrasonics Symposium (IUS) IEEE (2010) pp. 209-212.

Huang, S.F., et al., "Analysis of Tumor Vascularity Using Three-Dimensional Power Doppler Ultrasound Images," IEEE Transactions on Medical Imaging (2008) vol. 27, No. 3 pp. 320-330.

Lam, L., et al., "Thinning Methodologies—A Comprehensive Survey," IEEE Tran. On Pattern Analysis and Machine Intelligence (1992) 14:869-885.

Moccia, S., et al., "Blood vessel segmentation algorithms—Review of methods, datasets and evaluation metrics." Computer Methods and Programs in Biomedicine (2018) 158, 71-91. doi:https://doi.org/10.1016/j.cmpb.2018.02.001.

Passat, N., et al., "Region-growing segmentation of brain vessels: an atlas-based automatic approach." J Magn Reson Imaging (2005) 21(6), 715-725. doi:10.1002/jmri.20307.

International Searching Authority International Search Report issued for PCT/US2019/065219 dated Mar. 30, 2020.

International Bureau of WIPO, International Preliminary Report on Patentability and Written Opinion issued for PCT/US2019/065219 dated Jun. 8, 2021.

* cited by examiner

SYSTEMS AND METHODS FOR QUANTIFYING VESSEL FEATURES IN ULTRASOUND DOPPLER IMAGES

CROSS-REFERENCE TO RELATED APPLICATIONS

This application is a 371 U.S. National Phase application of PCT/US2019/065219, filed Dec. 9, 2019, which claims the benefit of U.S. Provisional Patent Application Ser. No. 62/776,955, filed on Dec. 7, 2018, and entitled "SYSTEMS AND METHODS FOR QUANTIFYING VESSEL FEATURES IN ULTRASOUND DOPPLER IMAGES," which is herein incorporated by reference in its entirety.

STATEMENT REGARDING FEDERALLY SPONSORED RESEARCH

This invention was made with government support under CA148994, EB017213, CA168575, and CA195527 awarded by the National Institutes of Health. The government has certain rights in the invention.

BACKGROUND

Microvasculature architecture is known to be associated with tissue state and pathology. Different conditions and diseases can alter vasculature at different size scales. For instance, malignant tumor growth has been found to coincide with changes in the vascularity of normal tissue; malignant tumors are known to present different mechanical features, leading to the growth of more permeable and tortuous vessels; and vessel tortuosity has been found to reveal information about some diseases. It has also been shown that microvascular parameters such as vessel size and branching correlate well with tumor aggressiveness and angiogenesis.

Quantitative information can be derived from microvasculature images obtained by contrast agent ultrasound imaging. These techniques seek to screen a measure of blood flow inside a tissue volume by testing the increase in ultrasound signal from the blood pool contrast agents. While these methods have been shown to quantify the architecture of the blood vessels in thyroid nodules and breast lesions, the use of contrast agents remains a barrier for these methods finding routine clinical use.

It would be desirable, then, to provide methods for quantifying features of microvasculature images obtained without the use of a contrast agent.

SUMMARY OF THE DISCLOSURE

The present disclosure addresses the aforementioned drawbacks by providing a method for generating quantitative vessel feature data from non-contrast ultrasound data. A microvasculature image is provided to a computer system. The microvasculature image having been acquired with an ultrasound system from a subject without a contrast agent. The microvasculature image is converted to a binary image and vessel segment data are generated from the binary image by morphologically filtering the binary image. The vessel segment data represent segmented vessels depicted in the microvasculature image. Quantitative vessel feature data are generated from the vessel segment data. The quantitative vessel feature data can include quantitative vessel structure data, vessel diameter data, vessel tortuosity data, or combinations thereof. A graphical user interface can be generated with the computer system and the quantitative vessel feature data can be displayed to a user in connection with the graphical user interface.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Described here are systems and methods for quantifying vessel features in non-contrast microvasculature images obtained with an ultrasound imaging system. Vessel features that are quantified include, but are not limited to, vessel structure features (e.g., number of vessels, vessel density, number of branch points), vessel diameter, and vessel tortuosity.

The systems and methods described in the present disclosure may be used to analyze the structure of blood vessels and to extract quantitative features from ultrasound Doppler images (e.g., high resolution ultrasound Doppler images). These quantitative features can be used to characterize or differentiate various different vessel architectures. This information may then be used by a clinician to aid a diagnosis of various different diseases. For instance, the systems and methods described in the present disclosure provide a tool for quantification of microvasculature images from non-contrast ultrasound imaging, and may result in potential biomarkers for the diagnosis of some diseases, such as breast cancer.

Morphological features of small vessels provide useful information regarding underlying tissue, especially in cancerous tumors. The systems and methods described in the present disclosure provide for quantifying morphological features from microvasculature images obtained by non-contrast ultrasound imaging. In general, these types of images suffer from artifacts that limit the quantitative analysis of vessel morphological features. Advantageously, the systems and methods described in the present disclosure address this problem and provide for improved accuracy of the morphological assessment for quantitative vessel analysis in presence of these artifacts.

As one example, artifacts can be reduced by additional filtering. Vessel segments obtained by a skeletonization of regularized microvasculature images are also analyzed to satisfy additional constraints, such as the diameter and length of the vessel segments.

As another example, the measurement of some morphological metrics, such as tortuosity, depends on preserving large vessel trunks that may be broken down into multiple branches. The systems and methods described in the present disclosure can address this problem in a number of different ways. As one non-limiting example, small vessel segments are suppressed in the vessel filtering process via adjusting the size scale of the regularization. As a result, the tortuosity of the large trunks can be more accurately estimated by preserving longer vessel segments. As another non-limiting example, small connected vessel segments are removed by a combination of morphological erosion and dilation operations on the segmented vasculature images.

Figure 1:
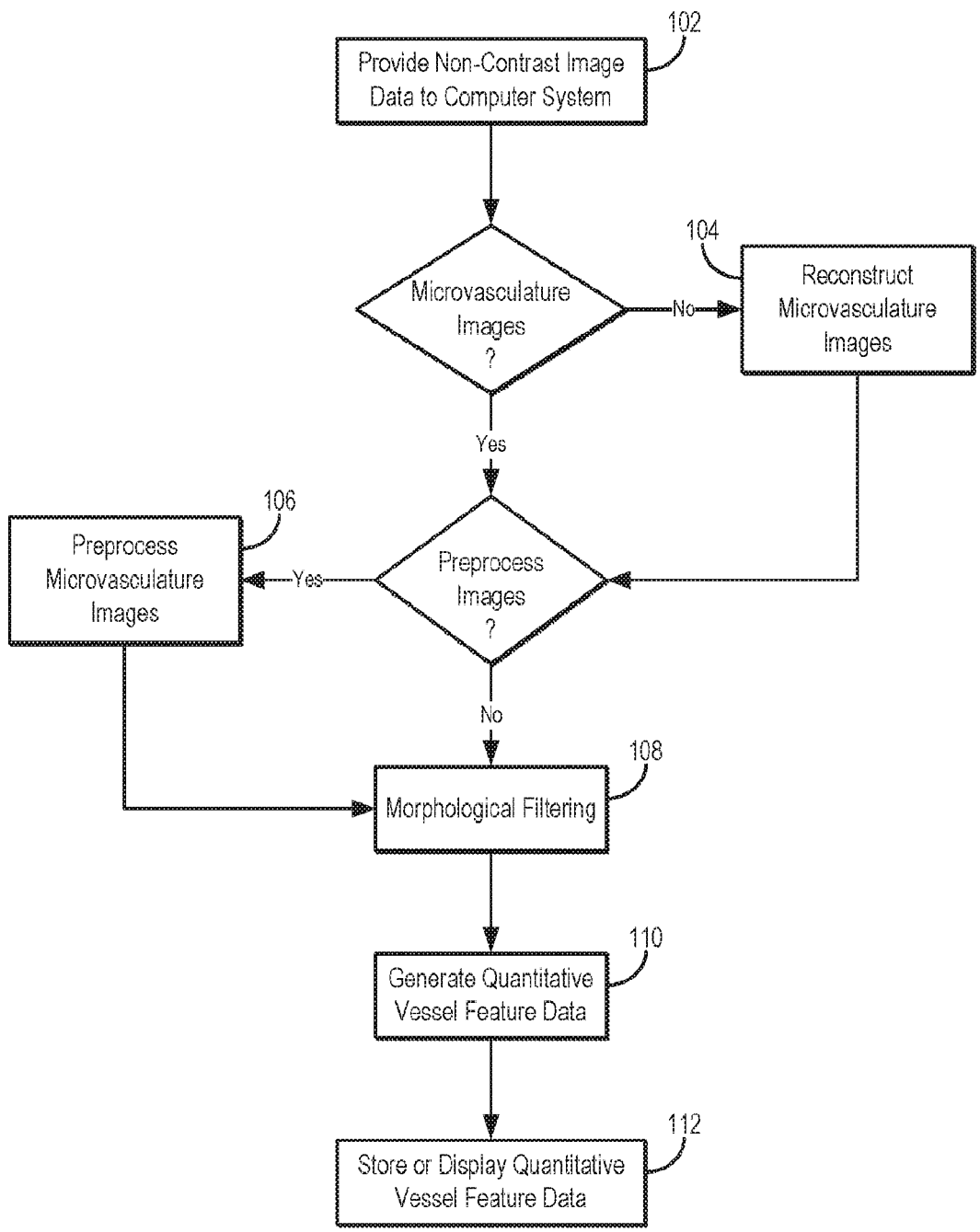
FIG. 1 is a flowchart setting forth the steps of an example method for generating quantitative vessel feature data from non-contrast ultrasound images of microvasculature.

Referring now to FIG. 1, a flowchart is illustrated as setting forth the steps of an example method for generating quantitative vessel feature data from non-contrast ultrasound data. The method includes providing image data to a computer system, as indicated at step 102. The image data may be provided to the computer system by retrieving or otherwise accessing image data from a memory or other data storage device or medium. Additionally or alternatively, the image data may be provided to the computer system by acquiring image data with an ultrasound imaging system and communicating the acquired image data to the computer system, which may form a part of the ultrasound imaging system. In any such instance, the image data are preferably acquired without the use of an ultrasound contrast agent (e.g., a microbubbles-based contrast agent). The image data may be two-dimensional image data or three-dimensional image data.

In some instances, the image data contain microvasculature images that depict the microvasculature in a region of a subject from which the images were obtained. In other instances, the image data contain a sequence of ultrasound images, such as a sequence of plane wave ultrasound images. In these instances, one or more microvasculature images are first reconstructed from the sequence of ultrasound images, as indicated at optional step 104. As one example, a method for reconstructing a microvasculature image from a sequence of plane wave ultrasound images is described by M. Bayat, et al., in "Background removal and vessel filtering of non-contrast ultrasound images of microvasculature," *IEEE Trans. on Biomedical Eng.*, 2018:1-1.

In this example, the ultrasound plane wave image data can be stored or otherwise converted into an in-phase-quadrature ("IQ") format. These data can be characterized by a complex-valued variable that is a function of the lateral dimension (x), axial dimension (z), and time (t) (i.e., ultrasound imaging slow time). For instance, the signal can be described as, $$s(x,z,t)=c(x,z,t)+b(x,z,t)+n(x,z,t) \quad (1);$$

Where $c(x,z,t)$ is the clutter signal, $b(x,z,t)$ is the blood signal, and $n(x,z,t)$ is additive thermal noise. Spatial and temporal characteristics of these three components differ. The additive thermal noise can be considered as zero Gaussian white noise. The signal corresponds to a signal data tensor, S, with dimensions $n_x \times n_z \times n_t$, where $n_x$ is the number of spatial samples along the x-direction (i.e., the lateral direction), $n_z$ is the number of spatial samples along the z-direction (i.e., the axial direction), and $n_t$ is the number of samples over time. The signal data tensor can be reshaped to form a Casorati matrix by transforming the tensor into a two-dimensional spatiotemporal matrix, $S_C$, with dimensions $(n_x \times n_z) \times n_t$.

Using a singular value decomposition ("SVD") of this spatiotemporal matrix results in, $$S_C = U \Delta V^\dagger \quad (2);$$

where $\Delta$ is an $(n_x \times n_z) \times n_t$ non-square diagonal matrix, U is an $(n_x \times n_z) \times (n_x \times n_z)$ matrix, V is an $n_t \times n_t$ matrix, and "$\dagger$" indicates the conjugate transpose. The matrices U and V are orthonormal matrices, and the columns of these matrices correspond to the spatial and temporal singular vectors, respectively, of $S_C$.

The matrix, $S_C$, can be decomposed into a sum of rank one matrix, $$S_C = \sum_i \lambda_i A_i = \sum_i \lambda_i U_i \otimes V_i; \quad (3)$$

where $U_i$ and $V_i$ are the $i^{th}$ columns of U and V, respectively; $\lambda_i$ is the $i^{th}$ ordered singular value of $S_C$; and "$\otimes$" denotes the outer product operation. Each column $V_i$ is a temporal signal with length $n_t$ and each column $U_i$ is a spatial signal with dimensionality $n_x \times n_z$ (i.e., a two-dimensional spatial image, $I_i$); hence, $$s(x, z, t) = \sum_{i=1}^{rank(S_C)} \lambda_i I_i(x, z) V_i(t). \quad (4)$$

In a low rank clutter filtering framework, the tissue component can be considered to correspond to the first few dominant singular values and vectors, while the blood signal can be formed by the subsequent singular values when sorted in a descending order. Based on these assumptions on tissue and blood signals, clutter removal is performed using a threshold, n, on the number of singular vectors removed from $s(x,z,t)$. Therefore, the blood signal can be derived as follows, $$s_{blood}(x, z, t) = s(x, z, t) - \sum_{i=1}^{n} \lambda_i I_i(x, z) V_i(t). \quad (5)$$

The threshold, n, can be selected based on setting a threshold on the slope of the second order derivative of the eigenvalues decay. The filtered blood signal, $s_{blood}(x,z,t)$, can be used to produce a power Doppler image as, $$I(x, z) = \sum_{k=1}^{K} |s_{blood}(x, z, kT)|^2; \quad (6)$$

where T is the sampling time between two successive ultrasound frames, which may be successive ultrafast ultrasound frames. The clutter removal performance can be further enhanced by enforcing a unilateral Doppler shift, which is expected to occur from the unidirectional flow in vessels, before forming the intensity image in Eqn. (6). In these instances, the final image can be formed as, $$I(x,z) = |I_p - I_n| \qquad (7);$$

where $I_p$ is the energy at the positive frequency side of the spectrum, $$I_p = \int_0^\infty |S_{blood}(x, z, f)|^2 df; \qquad (8)$$

where $S_{blood}(x,z,f)$ is the Fourier transform of the blood signal, $s_{blood}(x,z,t)$, and $I_n$ is the energy at the negative frequency side of the spectrum, $$I_n = \int_{-\infty}^0 |S_{blood}(x, z, f)|^2 df. \qquad (9)$$

The image, I(x,z) can be filtered to remove background noise. As one example, the image can be filtered using a top hat filter ("THF"). A THE implements a background estimation followed by a background subtraction operation. The output image of the THF can be denoted as $I_T(x,z)$.

Referring again to FIG. 1, the microvasculature images are then preprocessed, as generally indicated at step 106. In some instances, the microvasculature images may have already been preprocessed (e.g., the microvasculature images stored in the memory or other data storage device or medium are preprocessed microvasculature images), in which case step 106 can be skipped. In general, preprocessing the microvasculature images can include vessel filtering to enhance the structure of vessels depicted in the microvasculature images, and to provide adequate background separation for segmentation.

As one example of preprocessing a microvasculature image, to enhance the visibility of the microvasculature image in the presence of strong background signals, morphological filtering based on a THF can be used. Due to background noise, however, random patterns will also be present at the output of a THF. Hence, vessel enhancement filters are used to penalize background noise and further enhance vessel structure. Enhancement filters based on the analysis of eigenvalues of a Hessian matrix applied on a two-dimensional image selectively amplify a specific local intensity profile or structure in an image. Hessian-based filters distinguish between different local structures by analyzing the second order intensity derivatives at each point in the image. To enhance the local structures of various sizes, the analysis is typically performed on a Gaussian scale space of the image.

The image output of the THF, $I_T(x,z)$, denotes the intensity of a two-dimensional image at coordinates (x,z). The Hessian of $I_T(x,z)$ at scale, s, can be represented by a 2×2 matrix, $$H(x, z, s) = \begin{bmatrix} s^2 I_T(x, z) * \frac{\partial^2}{\partial x^2} G(x, z, s) & s^2 I_T(x, z) * \frac{\partial^2}{\partial x \partial z} G(x, z, s) \\ s^2 I_T(x, z) * \frac{\partial^2}{\partial z \partial x} G(x, z, s) & s^2 I_T(x, z) * \frac{\partial^2}{\partial z^2} G(x, z, s) \end{bmatrix}; \qquad (10)$$

where s is the size scale of filtering, $G(x,z,s) = (2\pi s^2)^{-1} \exp(-(x^2+z^2)/2 s^2)$ is a two-dimensional Gaussian function, and "*" denotes convolution.

Selective enhancement of the local image structures is independent of the orientation. This enhancement is based on the shape and brightness of the structures and can be done by analyzing the signs and magnitudes of the Hessian eigenvalues, $\lambda_i$, $i \in \{1,2\}$. At each point (x,z), the eigenvalues can be obtained via eigenvalue decomposition of H (x,z,s).

In general, the Hessian-based enhancement maps eigenvalues of H(x,z,s) to values of 0 or 1. Therefore, this filter can be considered as a response of an indicator function of a certain set of eigenvalue relations. To limit unwanted fluctuations due to intensity variations of ultrasound Doppler image or noise, the indicator functions can be approximated by smooth enhancement functions $v: [eigH(x,z,s)] \rightarrow R^+$, which may have a non-negative response.

In some implementations of the systems and methods described in the present disclosure, vessel orientation is not of interest. In these instances, the eigenvalues may only be considered for additional vessel analysis. Because noise-like variations do not change eigenvalues significantly, the energy of the eigenvalues can be used as a measure for the assessment of the structured shapes (e.g., tubes and blobs), as opposed to random patterns. To minimize the effect of unwanted fluctuation of ultrasound signals, a multiscale filter response, F(x,z), can be obtained by maximizing a given enhancement function, $v$, at each point (x,z) over a range of scales, s, as follows:

$$F(x, z) = \sup_s \{v[eigH(x, z, s)] : s_{min} \leq s \leq s_{max}\}; \qquad (11)$$

where $\sup\{\cdot\}$ denotes the supremum and the values of $s_{min}$ and $s_{max}$ can be selected according to the respective minimal and maximal expected size of the structures of interest.

For two-dimensional images, the following vessel likeliness measure can be used for vessel filtering of the ultrasound microvasculature images, $$v_o(s) = \begin{cases} 0 & \text{if } \lambda_2 > 0 \\ \exp\left(-\frac{R_B^2}{2\beta^2}\right)\left(1 - \exp\left(-\frac{s^2}{2\alpha^2}\right)\right) & \text{otherwise} \end{cases}; \qquad (12)$$

where $R_B = \lambda_2/\lambda_1$ is the blobness measure in the two-dimensional image and accounts for the eccentricity of the second order ellipse; and where $\alpha$ and $\beta$ are filter parameters. The output of the Hessian filter can be denoted as $I_H(x,z)$.

Figure 2:
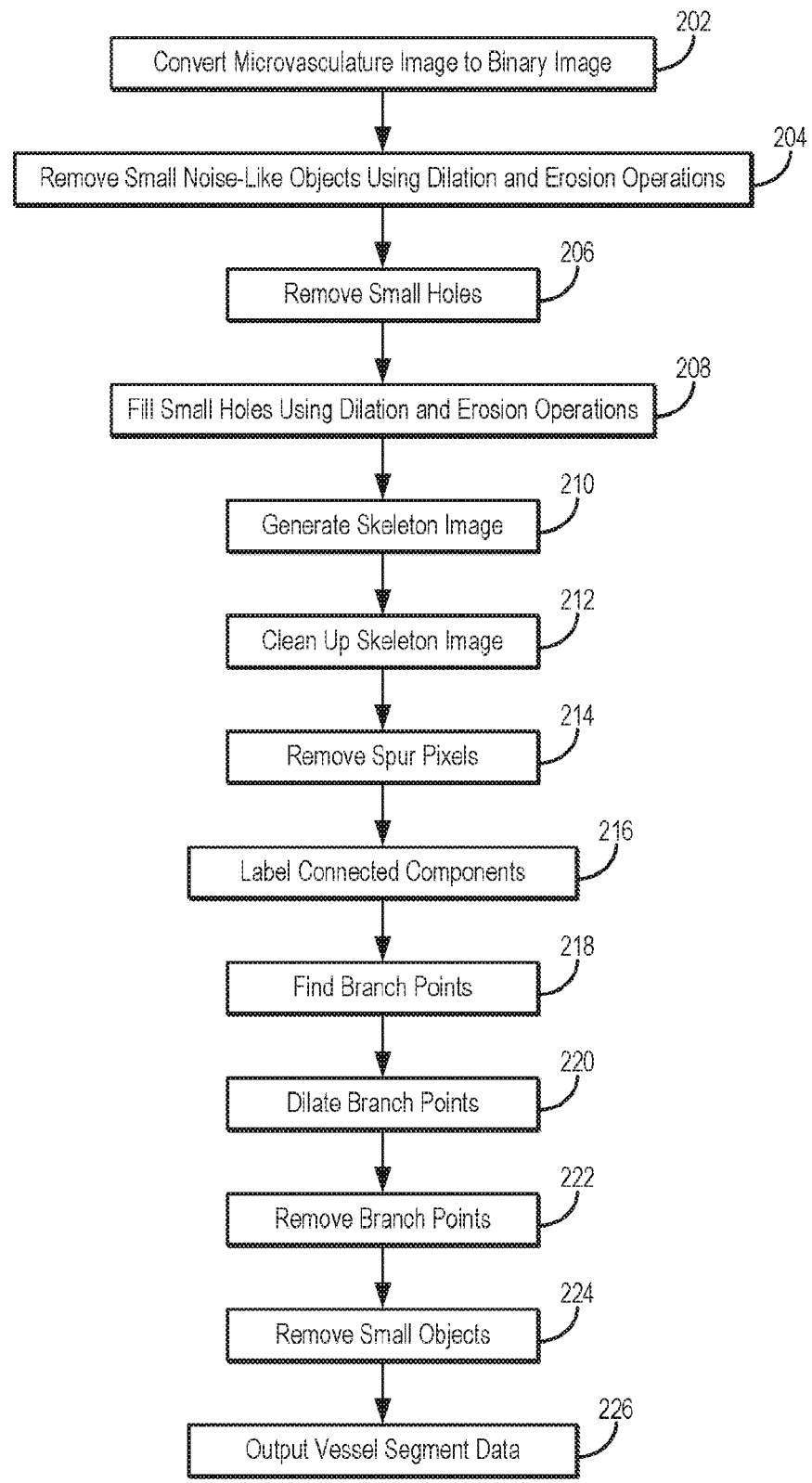
FIG. 2 is a flowchart setting forth examples of morphological filtering that can be implemented to generate vessel segment data.

Referring again to FIG. 1, the preprocessed microvasculature images are next filtered with one or more morphological filters, as indicated at step 108. An example of morphological filtering that can be applied to the preprocessed microvasculature images is shown in FIG. 2.

Morphological operations generally apply a structuring element to an input image, creating an output image of the same size. In a morphological operation, the value of each pixel in the output image is based on a comparison to the corresponding pixel in the input image with its neighbors. By choosing the size and shape of the neighborhood, a morphological operation that is sensitive to the specific shapes in the input image can be constructed.

In general, the morphological filtering implemented by the systems and methods described in the present disclosure includes converting the microvasculature image (e.g., a preprocessed microvasculature image output from a Hessian filter) to a binary image, as indicated at step 202; removing small noise-like objects through an erosion and dilation operation, as indicated at step 204; removing small holes, as indicated at step 206; filling small holes with a dilation and erosion operation, as indicated at step 208; generating an image skeleton, as indicated at step 210; cleaning the skeleton image, as indicated at step 212; removing spur pixels, as indicated at step 214; labeling connected components, as indicated at step 216; finding branch points, as indicated at step 218; dilating branch points, as indicated at step 220; removing branch points, as indicated at step 222; and removing small objects, as indicated at step 224. The output of this morphological filtering is an image that includes vessel segments, as indicated at step 226. These vessel segment data are subsequently analyzed to estimate desired quantitative parameters of the vessels.

In step 202, the microvasculature image can be converted to a binary image by setting an intensity threshold. The output binary image, $I_B(x,z)$, replaces all pixel values in the input image with luminance greater than a selected threshold with values of 1, and replaces all other pixel values with values of 0. When the input image is an output of a Hessian filter and spectral subtraction described above, the input image will have values in the [0,1] range. In these instances, the threshold can be selected as a value in the same [0,1] range, which is the range output image after Hessian filtering.

In step 204, small noise-like objects can be removed from the binary image using erosion followed by dilation. Dilation adds pixels to the boundaries of objects in an image, while erosion removes pixels on object boundaries. The number of pixels added or removed from the objects in an image depends on the size and shape of the structuring element used to process the image. In the morphological dilation and erosion operations, the value of any given pixel in the output image is determined by applying a rule to the corresponding pixel and its neighbors in the input image.

In step 206, small holes are removed in the image output from step 204. Erroneous intensity nulling may exist in the input image at isolated points along the vessels with horizontal orientation. This intensity nulling is the effect of spectral nulling due to the ultrasound beam being perpendicular to the blood flow, resulting in symmetric spectrum in the frequency domain. Thus, the two components in the spectral subtraction of Eqn. (7) cancel each other. To avoid erroneous splitting of the vessels at these points, a morphological "hole-filling" is used to remove the small holes from the image output from step 204. As one example, removing the small holes can include setting a pixel to a value of 1 if five or more pixels in its 3-by-3 neighborhood are also 1s; otherwise, the pixel value is set to 0. After this operation, some small holes may still remain. To remove the remaining small holes in the vessels, a dilation followed by erosion operation is used to fill the remaining holes, as indicated at step 208.

The next step in the morphological operations on the binary images is to generate a skeleton image by removing pixels on the boundaries of objects without allowing objects to break apart. For instance, generating a skeleton image can include removing pixels in the binary images so that an object without holes shrinks to a line, and so that an object with holes shrinks to a connected ring halfway between each hole and the outer boundary. As one example, the skeleton image can be generated using a thinning algorithm, such as the one described by L. Lam, et al., in "Thinning methodologies-a comprehensive survey," *IEEE Trans. on Pattern Analysis and Machine Intelligence,* 1992; 14:869-885, which is herein incorporated by reference in its entirety.

Figure 3:
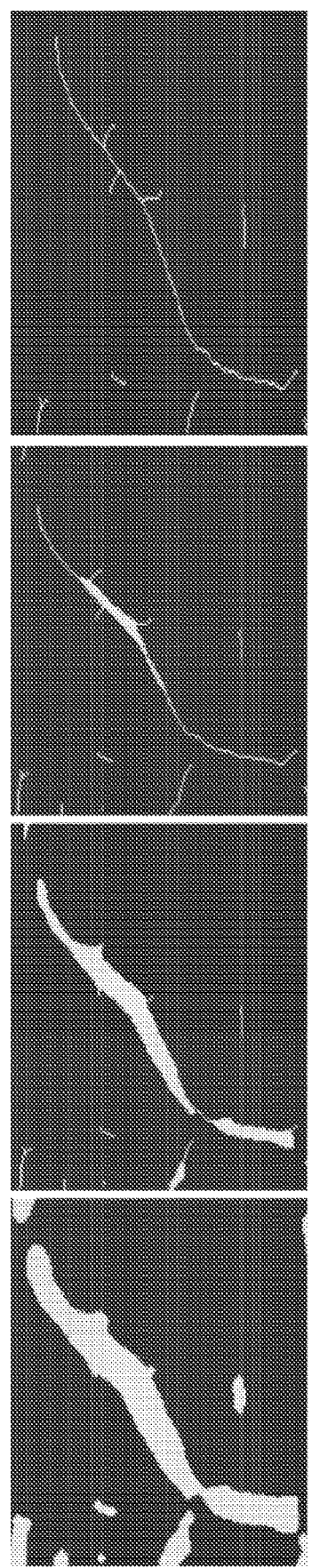
FIGS. 3A-3D show an example of a thinning algorithm being applied to a binary image to iteratively skeletonize the binary image.

FIG. 3A shows an example of a binary vessel segment used as the input image of a thinning algorithm, and FIGS. 3B-3D show the output image of a thinning algorithm after 5, 10, and 20 iterations. By increasing the number of iterations, the output image of the thinning algorithm converges to a skeleton image.

In step 212, the skeleton image is cleaned up by removing isolated pixels (e.g., 1s that are completely surrounded by 0s), such as the center pixel in the following pattern, $$\begin{bmatrix} 0 & 0 & 0 \\ 0 & 1 & 0 \\ 0 & 0 & 0 \end{bmatrix}.$$

In step 214, spur pixels are removed from the skeleton image. Spurs can be removed using a morphological pruning algorithm. In general, the pruning algorithm will remove all branches shorter than a given number of points. If a spur is shorter than the given number of points the spur will be removed.

In step 216, connected components are labeled. For example, groups of pixels that include a selected number of connected pixels will be labeled as a separate component.

In step 218, branch points are found. For example, branch points can be found as follows:

$$I = \begin{bmatrix} 0 & 0 & 1 & 0 & 0 \\ 0 & 0 & 1 & 0 & 0 \\ 1 & 1 & 1 & 1 & 1 \\ 0 & 0 & 1 & 0 & 0 \\ 0 & 0 & 1 & 0 & 0 \end{bmatrix} \rightarrow I_B = \begin{bmatrix} 0 & 0 & 0 & 0 & 0 \\ 0 & 0 & 0 & 0 & 0 \\ 0 & 0 & 1 & 0 & 0 \\ 0 & 0 & 0 & 0 & 0 \\ 0 & 0 & 0 & 0 & 0 \end{bmatrix}.$$

In step 220, branch points are dilated. For example, branch points can be dilated using a disk structuring element with a dilating size of one pixel, as follows:

$$I_B = \begin{bmatrix} 0 & 0 & 0 & 0 & 0 \\ 0 & 0 & 0 & 0 & 0 \\ 0 & 0 & 1 & 0 & 0 \\ 0 & 0 & 0 & 0 & 0 \\ 0 & 0 & 0 & 0 & 0 \end{bmatrix} \rightarrow I_D = \begin{bmatrix} 0 & 0 & 0 & 0 & 0 \\ 0 & 0 & 1 & 0 & 0 \\ 0 & 1 & 1 & 1 & 0 \\ 0 & 0 & 1 & 0 & 0 \\ 0 & 0 & 0 & 0 & 0 \end{bmatrix}.$$

In step 222, branch points are removed from the skeleton image. For example, branch points can be removed using a disk dilated image with a dilating size of one pixel, as follows, $$I = \begin{bmatrix} 0 & 0 & 1 & 0 & 0 \\ 0 & 0 & 1 & 0 & 0 \\ 1 & 1 & 1 & 1 & 1 \\ 0 & 0 & 1 & 0 & 0 \\ 0 & 0 & 1 & 0 & 0 \end{bmatrix} \rightarrow I_B = \begin{bmatrix} 0 & 0 & 1 & 0 & 0 \\ 0 & 0 & 0 & 0 & 0 \\ 1 & 0 & 0 & 0 & 1 \\ 0 & 0 & 0 & 0 & 0 \\ 0 & 0 & 1 & 0 & 0 \end{bmatrix}.$$

In step 224, small objects (e.g., small vessels) are removed from the binary image. For example, vessels with a length less than a threshold length value can be removed from the binary image. Additionally or alternatively, vessels with a diameter less than a threshold diameter value can be removed from the binary image. The microvasculature image is constructed from a sequence of two-dimensional ultrasound plane wave images in which some vessels are only partially visible in the imaging plane. This, in turn, results in observing small vessel segments in the image. The residual noise, when passed through the Hessian-based filtering, might also result in structures that may be perceived as small vessel segments. Hence, removing these unwanted, erroneous, or partial vessel segments can improve the reliability of the vessel segmentation.

Figure 4:
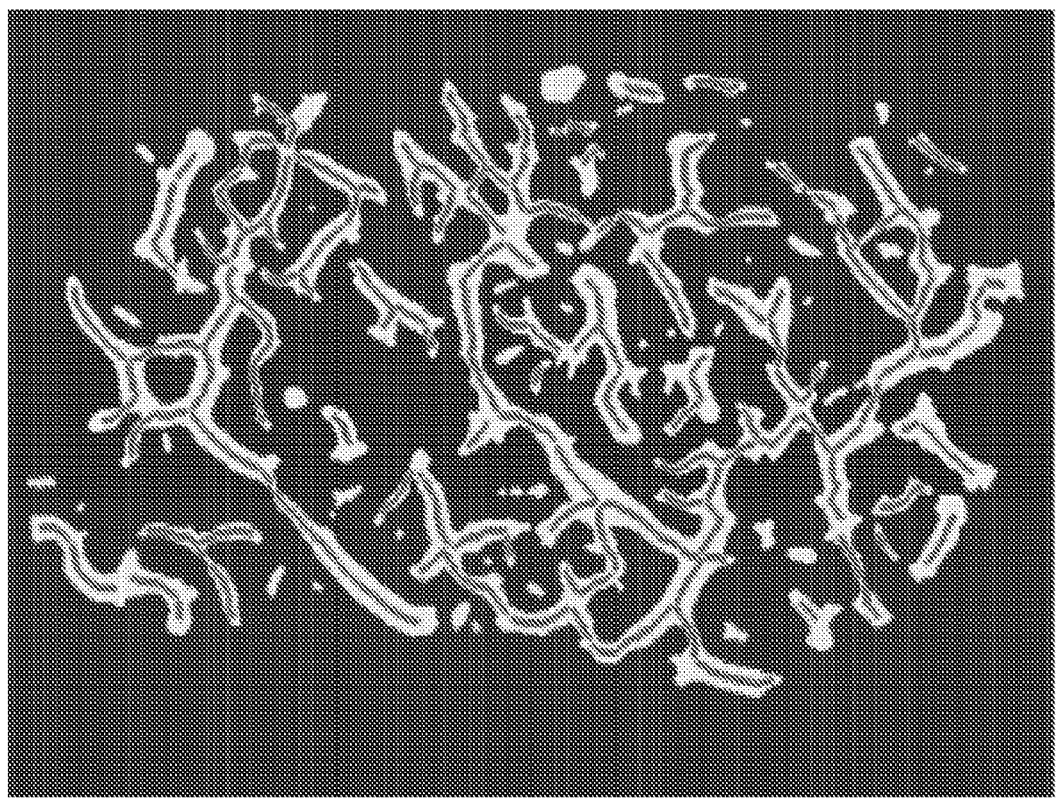
FIG. 4 is an example of vessel segment data displayed as being overlaid on a binary image generated from a microvasculature image.

In step 226 the resulting vessel segment data are stored or output for additional processing. An example of vessel segment data is shown in FIG. 4. In this example, the vessel segment data are overlaid on a binary image of the microvasculature image.

Referring again to FIG. 1, the vessel segment data output by performing morphological filtering on the input microvasculature images are processed to quantify vessel feature data, as generally indicated at step 110. As one non-limiting example, the vessel feature data may include vessel structure data (e.g., number of vessels, vessel density, number of branch points), vessel diameter data, and vessel tortuosity data. The vessel tortuosity data may include a number of tortuosity metrics, including a distance metric ("DM"), an inflection count metric ("ICM"), and a sum-of-angle metric ("SOAM"). Thus, quantifying the vessel feature data may include implementing a vessel structure analysis algorithm, a vessel diameter algorithm, and a vessel tortuosity algorithm.

The quantitative vessel feature data are then stored for later use, or displayed to a user, as indicated at step 112. For instance, the vessel feature data may be displayed in connection with a graphical user interface that enables a user to visualize the vessel feature data (e.g., as images, maps, or other display or textual elements), manipulate the vessel feature data, or otherwise interact with the vessel feature data.

Vessel Structure Data

As noted, the vessel structure data can include a quantification of the number of vessels depicted in the vessel segment data, the density of vessels depicted in the vessel segment data, the number of branch points in the vessel segment data, and so on. These parameters can be estimated or computed from the vessel segment data. For instance, when the vessel segment data contains labeled components associated with different vessels, the number of labeled components can be counted to determine the number of vessels depicted in the vessel segment data.

Another example of vessel structure data that can be quantified from the vessel segment data in a quantification of vessel trunks. In two-dimensional imaging of three-dimensional vascular structures, some vessels may only be partially visible in the imaging plane. Moreover, it is possible that vessels may appear to cross each other when they do not actually cross in three-dimensional space. This can occur because of the slice thickness of an ultrasound image. The vessels may visually seem to cross if both are within the slice thickness of the B-mode images and if they are not parallel. Most often, one vessel goes out of the imaging plane, making it look like a small branch. One of the consequences of branching for vessel quantification is that the main trunk can break into small vessel segments, which may adversely impact quantification of the morphological features of the trunk. To resolve this problem, two strategies can be used.

In one strategy, Hessian-based filtering with different minimum size scales can be used. In another strategy, morphological operations can be used to recover large trunk segments after branching of the small vessel segments. In the first method, the minimum size scale of the Hessian-based filtering, (i.e., $s_{min}$) controls the formation of small vessels in the image.

In the second method, a disk-shaped structuring element with radius r is used. Morphological operations using disk approximations run much faster when the structuring element uses approximations. Erosion followed by dilation can be performed on the vessel segment data, using the same structuring element for both operations.

An erosion/dilation ("ED") factor can be defined as follows:

$$ED := r \qquad (13);$$

to remove small objects and analyze trunks inside the lesion. Using this method, vessel structures with a size less than r are removed from the image. In dilation, only structures larger than r that remain in the image are dilated and converted to their original size. Therefore, it is contemplated that only vessel trunks will appear in the final image. In the tortuosity analysis described below, it is desirable to analyze the vessels that are fully located in the imaging plane. Therefore, by removing small vessel segments connected to main vessel trunks, it is possible to analyze the main vessel trunk.

Vessel Diameter Data

As one non-limiting example of computing vessel diameter data that quantifies localized vessel diameter, the binary image (e.g., the binary image represented by the vessel segment data) is first inverted. Therefore, pixels corresponding to the vessel are 0 and pixels corresponding to background are 1. Next, distances (e.g., a Euclidean distance) between zero pixels (corresponding to vessel segments) and the nearest non-zero pixel (corresponding to background) of the image are computed. For all pixels corresponding to vessels (zero pixels), the distance to the nearest non-vessel pixel (one pixel) is assigned to that pixel in the vessel diameter data. The set of points inside of the vessel region and the background region is denoted by V and B, respectively. For any point of $(x,z) \in V$, the Euclidian distance between $(x,z)$ and all points $(x_b, z_b) \in B$ is calculated and the minimum distance value is obtained as, $$d(x, z) = \min_{(x_b, z_b)} \sqrt{(x - x_b)^2 + (z - z_b)} \text{ such that } (x_b, z_b) \in B. \qquad (14)$$

Then, the image is skeletonized using a thinning algorithm, such as the thinning algorithm implemented during the morphological filtering described above, so that the distances along the centerlines can be calculated. The $i^{th}$ point at the center line of vessel j is denoted by $(x_{ij}, z_{ij})$. The vessel diameter is obtained by doubling the radius value of $d(x_{ij}, z_{ij})$. Therefore, the diameter of each vessel can be estimated at each point by, $$D(x_{ij}, z_{ij}) = 2d(x_{ij}, z_{ij}) \qquad (15).$$

For each vessel segment, the average diameter of the vessel segment over points related to that vessel can be obtained as, $$D_j = \frac{1}{N_j}\sum_{i=1}^{N_j} D(x_{ij}, z_{ij}). \tag{16}$$

Figure 5:
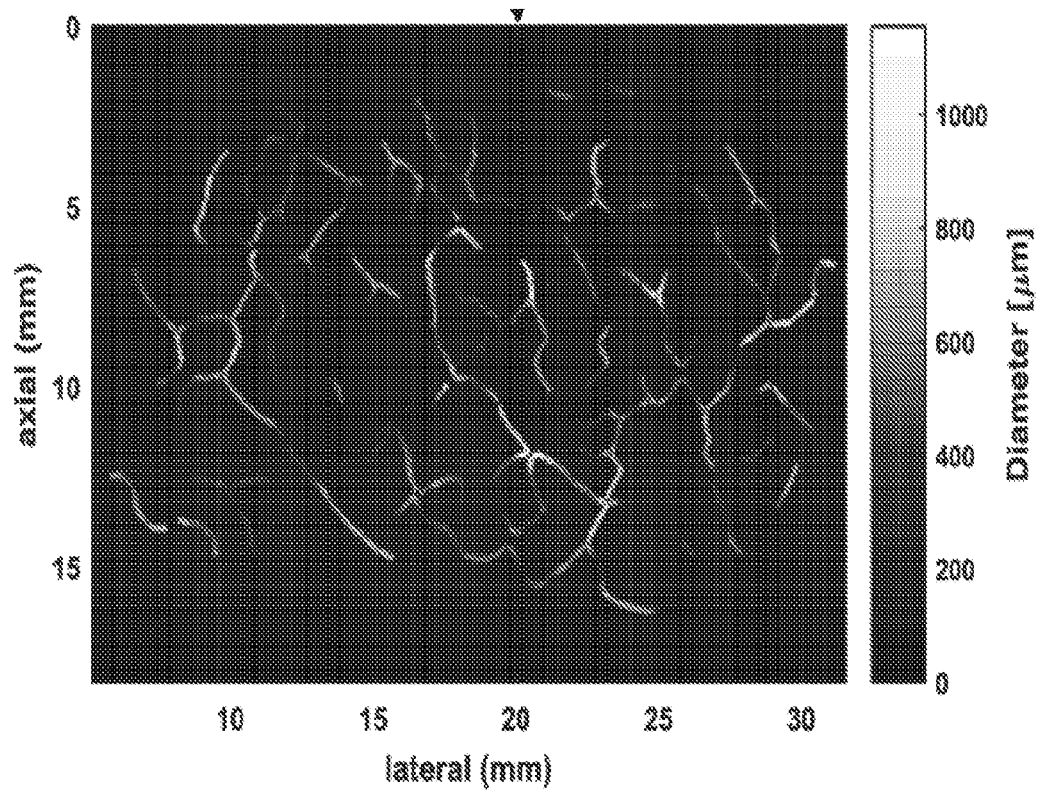
FIG. 5 is an example of a vessel diameter map generated from vessel segment data.

The resulting vessel diameter data can be stored for later use or analysis, and can also be displayed to a user. For instance, the vessel diameter data can be displayed as an image, which may look like the skeletonized image of the vessel segment, but having non-zero pixels whose values are assigned the vessel diameter estimated at that point. The vessel diameter data may be displayed in connection with a graphical user interface that enables visualization of, manipulation of, and/or user interaction with the vessel diameter data. An example image representative of vessel diameter data is shown in FIG. 5.

Vessel Tortuosity Data

Vessels can be tracked in the vessel segment data using a Moore-Neighbor tracing algorithm modified by Jacob's criteria. In these examples, the location vector of a vessel, j, is $P_j := [p_{1j}, \ldots, p_{N_j j}]$, where $p_{i,j} := [x_{ij}, z_{ij}]^T$ is the point, i, in the vessel, j, and $N_j$ is the length of the vessel, j.

The DM of a vessel provides a ratio between the actual path length of a meandering curve and the linear distance between endpoints as depicted by, $$DM_j = \frac{\sum_{k=2}^{N}|p_{k,j} - p_{k-1,j}|}{|p_{N,j} - p_{1,j}|}. \tag{17}$$

For an ICM, the matrices $$D_j^{(i)} := [d_{1j}^{(i)}, \ldots, d_{N_j-3j}^{(i)}]_{3\times(N_j-3)},$$

$i \in \{1,2\}$, are first defined by, $$d_{kj}^{(1)} = p_{kj} - p_{k-1j} \tag{18}$$

$$d_{kj}^{(2)} = p_{k+1j} - p_{kj} \tag{19};$$

where $k \in \{2, \ldots, N_j-2\}$.

The velocity matrix at the vessel is also defined as $$V_j := [v_{2j}, \ldots, v_{N_j-1j}]_{3\times(N_j-2)},$$

where $v_{kj}$ is the velocity vector at $p_{kj}$, and is given by, $$v_{kj} = p_{k+1j} - p_{k-1j} \tag{20}.$$

The acceleration matrix at the vessel is also defined as $$A_j := [a_{2j}, \ldots, a_{N_j-1j}]_{3\times(N_j-2)},$$

where $a_{kj}$ is the acceleration vector at $p_{kj}$, and is given by, $$a_{kj} = d_{kj}^{(2)} - d_{kj}^{(1)} \tag{21}.$$

The three axes of the Fernet frame can then be calculated at point $p_{kj}$ as, $$t_{kj} = \frac{v_{kj}}{|v_{kj}|}; \tag{22}$$

$$n_{kj} = \frac{v_{kj} \times a_{kj} \times v_{kj}}{|v_{kj} \times a_{kj} \times v_{kj}|}; \tag{23}$$

$$b_{kj} = t_{kj} \times n_{kj}. \tag{24}$$

By defining $\Delta N_j := [\Delta n_{1j}, \ldots, \Delta n_{N_j j}]$ where $\Delta n_{kj} = n_{kj} - n_{k-1j}$, passage through an inflection point can be recognized by searching for the local maximum of $\Delta n_{kj} \cdot \Delta n_{kj}$ when $\Delta N_j \cdot \Delta N_j > 1$; that is, $$ICM_j = \arg\max_k \Delta n_{kj} \cdot \Delta n_{kj} \text{ such that } \Delta N_j \cdot \Delta N_j > 1. \tag{25}$$

When the acceleration vector has no length, as occurs at inflection points or during passage over a straight line, the Fernet frame will be undefined. In these instances, the length of the acceleration can be checked and if its length is less than a selected value (e.g., $10^{-6}$ mm) the point can be skipped and the frame redefined at the next point.

For the SOAM, the displacement vectors between points $(p_{k-1,j}, p_{k,j})$ and $(p_{k+1,j}, p_{k,j})$ in vessel j are defined by, $$d_{k,j} = p_{k,j} - p_{k-1,j} \tag{26};$$

$$d_{k+1,j} = p_{k+1,j} - p_{k,j} \tag{27};$$

$$d_{k+2,j} = p_{k+2,j} - p_{k+1,j} \tag{28};$$

where $k \in \{2, \ldots, N_j-2\}$ and $N_j$ is the length of the vessel in pixels. The in-plane angle at point $p_{k,j}$ is given by, $$I_{kj} := \cos^{-1}\left(\left(\frac{d_{k,j}}{|d_{k,j}|}\right) \cdot \left(\frac{d_{k+1,j}}{|d_{k+1,j}|}\right)\right). \tag{29}$$

The torsional angle at point $p_{k,j}$ is represented by the angle between the plane of the current osculating circle, whose surface normal is the normalized cross product of the vector $d_{k,j}$ and $d_{k+1,j}$ and the surface of subsequent osculating plane, whose surface normal is the normalized cross product of the vector $d_{k+1,j}$ and $d_{k+2,j}$, which is defined as, $$T_{kj} := \cos\left(\left(\frac{d_{k,j} \times d_{k+1,j}}{|d_{k,j} \times d_{k+1,j}|}\right) \cdot \left(\frac{d_{k+1,j} \times d_{k+2,j}}{|d_{k+1,j} \times d_{k+2,j}|}\right)\right). \tag{30}$$

In two-dimensional imaging, two components of the internal product are parallel and $T_{kj}$ is derived as zero or 180 degrees. Torsional angles can in some instances be considered 0 when they are 180.

Therefore, the total angle $CP_{kj} := \sqrt{I_{kj}^2 + T_{kj}^2}$ at point $p_{k,j}$ and vessel j is given by, $$CP_{kj} = |I_{kj}| \tag{31}.$$

The SOAM calculates the total tortuosity of the vessel j, and is defined as, $$SOAM_j = \frac{\sum_{k=2}^{N_j-2} CP_{kj}}{\sum_{k=2}^{N}|p_{kj} - p_{k-1,j}|}. \tag{32}$$

Bayesian Method

In some instances, a lesion may be represented by a binary image, $L_i$. A binary and independent and identically distributed random variable, $V_i \in \{0,1\}$ for representing the vascularity in $L_i$ with the following probabilities can be defined:

$$Pr(V_i=1):=p \qquad (33);$$

where $p_i$ is defined as, $$p_i := \frac{|L_i^1|}{|L_i|}; \qquad (34)$$

where $|g|$ denotes the cardinality (i.e., the number of pixels) of a binary image, g, and $L_i^1 \subset L_i$ in which pixels of $L_i$ are equal to 1. The probability of having a vessel with x diameter in lesion i is given by, $$Pr(D_i = x) = \sum_{j=1}^{2} p_j Pr(D_i = x | V_i = j) \qquad (35)$$
$$= (1-p_1)\delta(x) + p_1 Pr(D_i = x | V_i = 1);$$

where $\delta(\cdot)$ denotes the delta function. For a set of patient images denotes by $L:=\{L_1, \ldots, L_N\}$, each member of this set is an image with maximum vessel density selected from at least four available images in two different orientations of longitudinal and transverse. In the set of I, two subsets based on a pathology report are present: a benign lesion subset $B:=\{b_1, \ldots, b_{N_B}\}$ and a malignant lesion subset $M:=\{m_1, \ldots, m_{N_M}\}$, where $N_B$ and $N_M$ are the number of benign and malignant lesions in the patient population pool. The probability of having a vessel with x μm diameter in the benign lesion subset, B, based on Bayes' rule is given by, $$Pr(D = x | b_1, \ldots, b_{N_B}) = \frac{Pr(b_1, \ldots, b_{N_B} | D = x) Pr(D = x)}{Pr(b_1, \ldots, b_{N_B})}. \qquad (36)$$

Assuming that $b_i$ are independent events, Eqn. (36) can be rewritten as, $$Pr(D = x | b_1, \ldots, b_{N_B}) = \prod_{i=1}^{N_B} \frac{Pr(b_i | D = x) Pr(D = x)}{Pr(b_i)} \qquad (37)$$
$$= \prod_{i=1}^{N_B} \frac{\frac{Pr(D = x | b_i) Pr(b_i)}{Pr(D = x)} Pr(D = x)}{Pr(b_i)}$$
$$= \prod_{i=1}^{N_B} Pr(D = x | b_i).$$

In a similar way, the probability of having a vessel with x μm diameter in the malignant lesion subset, M, is given by, $$Pr(D = x | m_1, \ldots, m_{N_M}) = \prod_{i=1}^{N_M} Pr(D = x | m_i). \qquad (38)$$

Two interested parameters for comparison of the malignant and benign populations are the probability of having vessels in a specified range or having a vessel larger than a threshold value. These parameters can be respectively defined as, $$Pr(D_{min} < D_i \leq D_{max}) \stackrel{D_{min}>0}{=} p_1 Pr(D_{min} < D \leq D_{max} | V_i = 1); \qquad (39)$$

$$Pr(D_i \geq D_{min}) = p_1 Pr(D_{min} < D \leq D_{max} | V_i = 1). \qquad (40)$$

A probabilistic approach can be applied to other quantitative parameters in the quantitative vessel feature data, such as the number of vessel segments, DM, SOAM, ICM, and so on. In some instances, the importance of lesions for comparing patient populations of malignant and benign cases is weighted by their vessel density.

Thus, methods for quantifying tissue microvasculature obtained by non-contrast ultrasonic microvasculature imaging has been described. The microvasculature image depicts vessel segments resulting from blood activity. Techniques for estimating morphometric parameters with additional morphological constrains to reduce erroneous data have been described. Vascular structures were accepted as vessel segments when multiple constraints on amplitude of the vessel segment, diameter of the vessel segment, and length of the vessel segment were satisfied.

The methods described in the present disclosure address challenges in acquiring segmentation-ready microvasculature images. A combination of background removal and vessel enhancement filtering enables vessel segmentation and skeletonization, which in turn allowing morphological analysis. The quantitative parameters (e.g., vessel feature data) may include tortuosity measures, (e.g., DM, ICM, and SOAM), diameter of vessel segments, length of vessel segments, number of vessel segments, number of branching points, and vessel density.

Given the two-dimensional nature of B-mode ultrasound imaging, accurate interpretation of some vascular features can be difficult. Two-dimensional cross sectional imaging may provide erroneous branching and vessel crossings that may lead to incorrect interpretation of the vessel segments. While quantitative evaluation of parameters, such as vessel density and diameter, are not significantly affected by this phenomenon, measures of the tortuosity, number of branching points, and number of vessel segments may become inaccurate. In these instances, a number of strategies to enable extraction of several morphological features by adding additional constrains have been described to overcome these problems. For instance, methods have been described for preserving large vessel trunks that may be broken into small pieces due to intersection with out-of-plane vessel segments-namely by removing small size-scales from the vessel filtering—and small vessel segments connected to large trunks via morphological operations.

Microvasculature images may also be disadvantaged in that small vessel segments may result from cross sectional imaging of vessels. These may appear as small vessel segments with incorrect information regarding the vascular tree segments. In these instances, these problems can be addressed by enforcing vessel segment length and diameter constraints.

The methods described in the present disclosure therefore provide a set of tools for quantitative assessment of microvasculature morphological features. These features may be associated with certain diseases or different health conditions. In cancer, for example, malignant tumors have been shown to give rise to tortuous vessels. Quantitative morphological parameters (e.g., vessel feature data) may allow differentiation of certain lesions, such as benign and malignant breast lesions. Therefore, the methods described in the present disclosure for quantitative assessment of microvasculature morphological features obtained from non-contrast ultrasound images may result in potential biomarkers for the diagnosis of some diseases.

Figure 6:
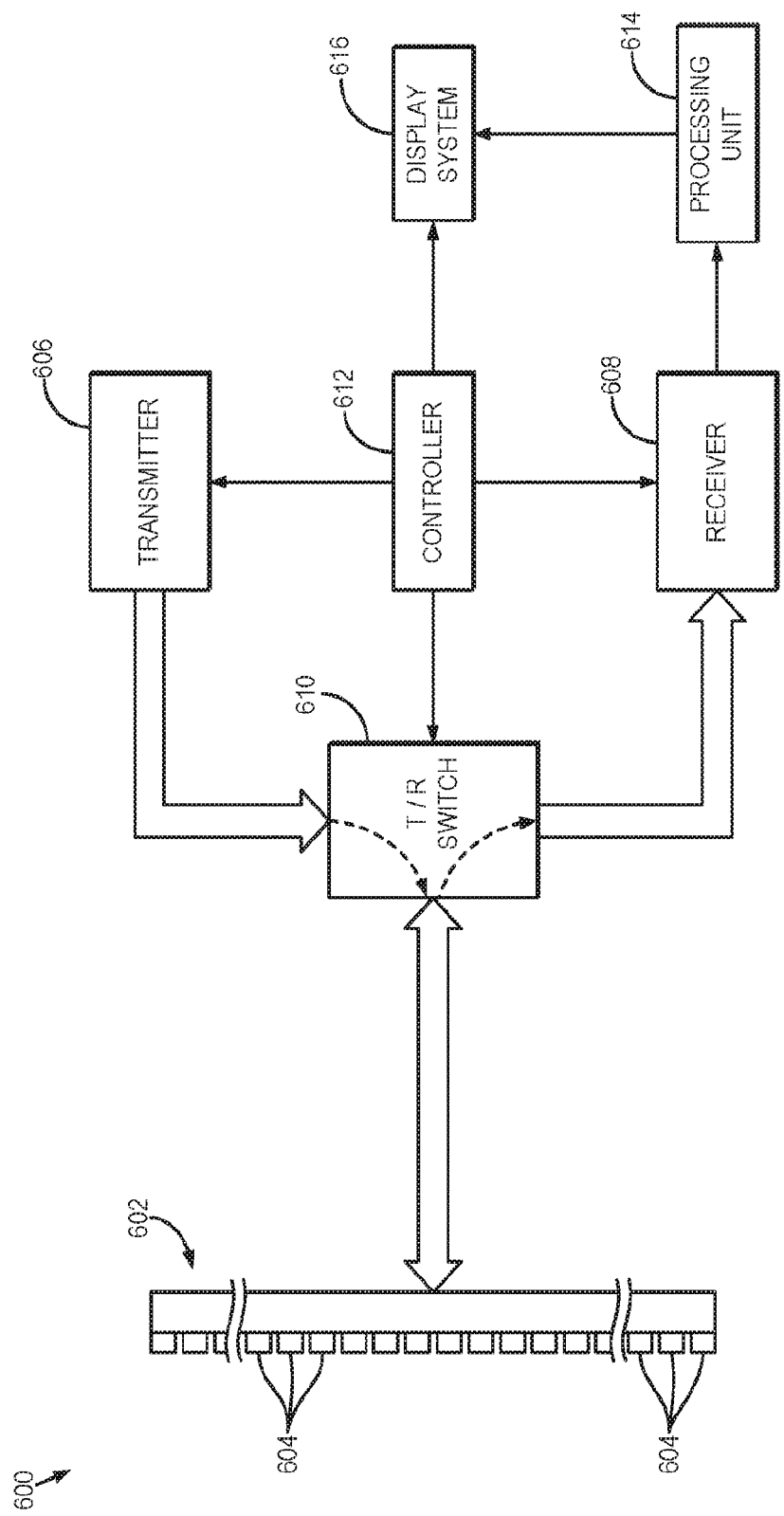
FIG. 6 is a block diagram of an example ultrasound system that can be implemented in accordance with some embodiments described in the present disclosure.

FIG. 6 illustrates an example of an ultrasound system 600 that can implement the methods described in the present disclosure. The ultrasound system 600 includes a transducer array 602 that includes a plurality of separately driven transducer elements 604. The transducer array 602 can include any suitable ultrasound transducer array, including linear arrays, curved arrays, phased arrays, and so on. Similarly, the transducer array 602 can include a 1D transducer, a 1.5D transducer, a 1.75D transducer, a 2D transducer, a 3D transducer, and so on.

When energized by a transmitter 606, a given transducer element 604 produces a burst of ultrasonic energy. The ultrasonic energy reflected back to the transducer array 602 (e.g., an echo) from the object or subject under study is converted to an electrical signal (e.g., an echo signal) by each transducer element 604 and can be applied separately to a receiver 608 through a set of switches 610. The transmitter 606, receiver 608, and switches 610 are operated under the control of a controller 612, which may include one or more processors. As one example, the controller 612 can include a computer system.

The transmitter 606 can be programmed to transmit unfocused or focused ultrasound waves. In some configurations, the transmitter 606 can also be programmed to transmit diverged waves, spherical waves, cylindrical waves, plane waves, or combinations thereof. Furthermore, the transmitter 606 can be programmed to transmit spatially or temporally encoded pulses.

The receiver 608 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 606 and the receiver 608 can be programmed to implement a high frame rate. For instance, a frame rate associated with an acquisition pulse repetition frequency ("PRF") of at least 100 Hz can be implemented. In some configurations, the ultrasound system 600 can sample and store at least one hundred ensembles of echo signals in the temporal direction.

A scan can be performed by setting the switches 610 to their transmit position, thereby directing the transmitter 606 to be turned on momentarily to energize transducer elements 604 during a single transmission event. The switches 610 can then be set to their receive position and the subsequent echo signals produced by the transducer elements 604 in response to one or more detected echoes are measured and applied to the receiver 608. The separate echo signals from the transducer elements 604 can be combined in the receiver 608 to produce a single echo signal.

The echo signals are communicated to a processing unit 614, which may be implemented by a hardware processor and memory, to process echo signals or images generated from echo signals. As an example, the processing unit 614 can implement the methods described in the present disclosure for generating quantitative vessel feature data from non-contrast ultrasound data. Images produced from the echo signals by the processing unit 614 can be displayed on a display system 616.

Figure 7:
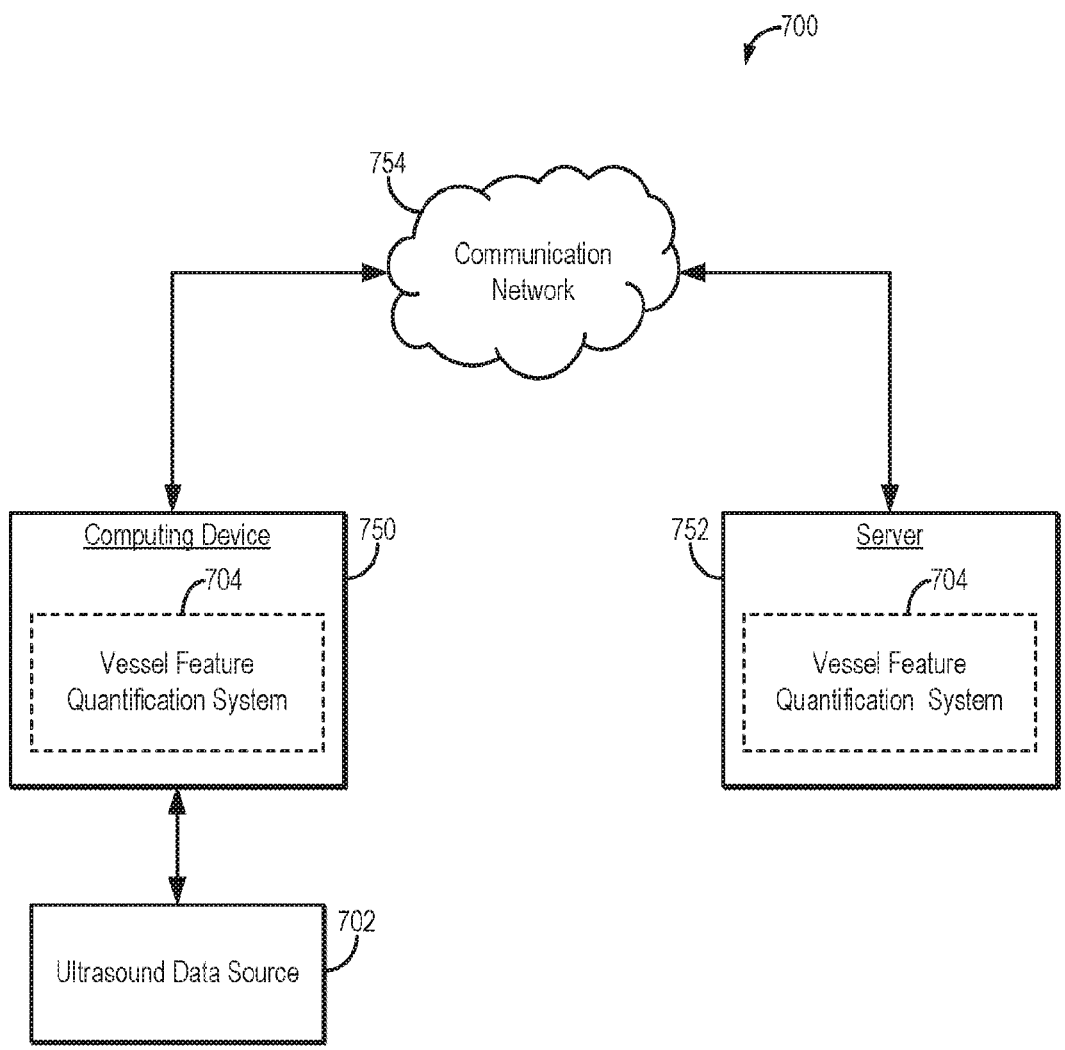
FIG. 7 is a block diagram of an example system for quantifying vessel feature data from non-contrast ultrasound images of tissue microvasculature.

Referring now to FIG. 7, an example of a system 700 for quantifying vessel feature data from non-contrast ultrasound data in accordance with some embodiments of the systems and methods described in the present disclosure is shown. As shown in FIG. 7, a computing device 750 can receive one or more types of data (e.g., non-contrast ultrasound data, microvasculature images) from ultrasound data source 702, which may be an ultrasound data source. In some embodiments, computing device 750 can execute at least a portion of a vessel feature quantification system 704 to generate quantitative vessel feature data from data received from the ultrasound data source 702.

Additionally or alternatively, in some embodiments, the computing device 750 can communicate information about data received from the ultrasound data source 702 to a server 752 over a communication network 754, which can execute at least a portion of the vessel feature quantification system 704 to generate quantitative vessel feature data from data received from the ultrasound data source 702. In such embodiments, the server 752 can return information to the computing device 750 (and/or any other suitable computing device) indicative of an output of the vessel feature quantification system 704 to generate quantitative vessel feature data from data received from the ultrasound data source 702.

In some embodiments, computing device 750 and/or server 752 can be any suitable computing device or combination of devices, such as a desktop computer, a laptop computer, a smartphone, a tablet computer, a wearable computer, a server computer, a virtual machine being executed by a physical computing device, and so on. The computing device 750 and/or server 752 can also reconstruct images from the data.

In some embodiments, ultrasound data source 702 can be any suitable source of image data (e.g., measurement data, images reconstructed from measurement data), such as an ultrasound system, another computing device (e.g., a server storing image data), and so on. In some embodiments, ultrasound data source 702 can be local to computing device 750. For example, ultrasound data source 702 can be incorporated with computing device 750 (e.g., computing device 750 can be configured as part of a device for capturing, scanning, and/or storing images). As another example, ultrasound data source 702 can be connected to computing device 750 by a cable, a direct wireless link, and so on. Additionally or alternatively, in some embodiments, ultrasound data source 702 can be located locally and/or remotely from computing device 750, and can communicate data to computing device 750 (and/or server 752) via a communication network (e.g., communication network 754).

In some embodiments, communication network 754 can be any suitable communication network or combination of communication networks. For example, communication network 754 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 108 can be a local area network, a wide area network, a public network (e.g., the Internet), a private or semi-private network (e.g., a corporate or university intranet), any other suitable type of network, or any suitable combination of networks. Communications links shown in FIG. 7 can each be any suitable communications link or combination of communications links, such as wired links, fiber optic links, Wi-Fi links, Bluetooth links, cellular links, and so on.

Figure 8:
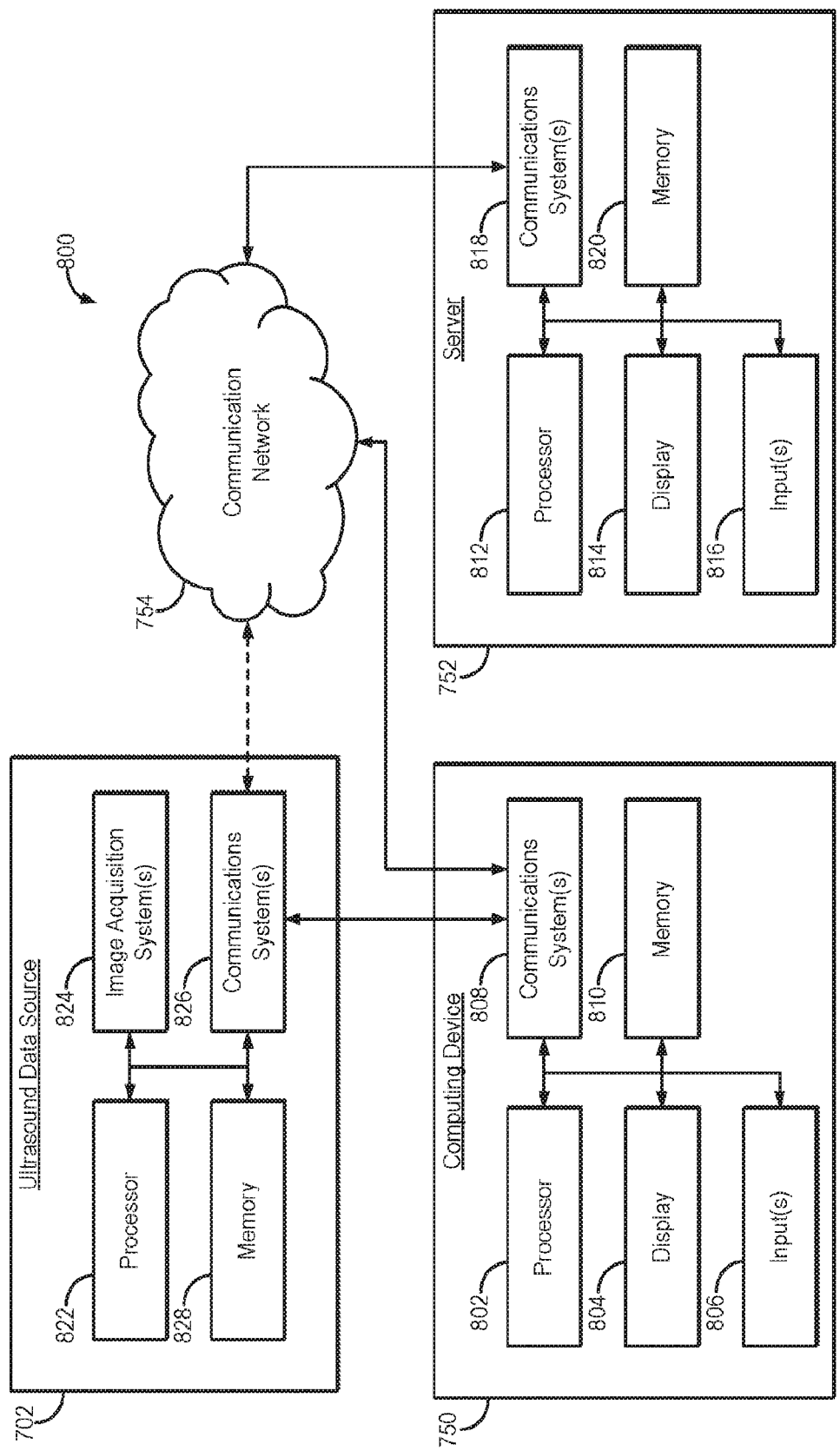
FIG. 8 is a block diagram of example hardware that can implement the system of FIG. 7.

Referring now to FIG. 8, an example of hardware 800 that can be used to implement ultrasound data source 702, computing device 750, and server 754 in accordance with some embodiments of the systems and methods described in the present disclosure is shown. As shown in FIG. 8, in some embodiments, computing device 750 can include a processor 802, a display 804, one or more inputs 806, one or more communication systems 808, and/or memory 810. In some embodiments, processor 802 can be any suitable hardware processor or combination of processors, such as a central processing unit ("CPU"), a graphics processing unit ("GPU"), and so on. In some embodiments, display 804 can include any suitable display devices, such as a computer monitor, a touchscreen, a television, and so on. In some embodiments, inputs 806 can include any suitable input devices and/or sensors that can be used to receive user input, such as a keyboard, a mouse, a touchscreen, a microphone, and so on.

In some embodiments, communications systems 808 can include any suitable hardware, firmware, and/or software for communicating information over communication network 754 and/or any other suitable communication networks. For example, communications systems 808 can include one or more transceivers, one or more communication chips and/or chip sets, and so on. In a more particular example, communications systems 808 can include hardware, firmware and/or software that can be used to establish a Wi-Fi connection, a Bluetooth connection, a cellular connection, an Ethernet connection, and so on.

In some embodiments, memory 810 can include any suitable storage device or devices that can be used to store instructions, values, data, or the like, that can be used, for example, by processor 802 to present content using display 804, to communicate with server 752 via communications system(s) 808, and so on. Memory 810 can include any suitable volatile memory, non-volatile memory, storage, or any suitable combination thereof. For example, memory 810 can include RAM, ROM, EEPROM, one or more flash drives, one or more hard disks, one or more solid state drives, one or more optical drives, and so on. In some embodiments, memory 810 can have encoded thereon, or otherwise stored therein, a computer program for controlling operation of computing device 750. In such embodiments, processor 802 can execute at least a portion of the computer program to present content (e.g., images, user interfaces, graphics, tables), receive content from server 752, transmit information to server 752, and so on.

In some embodiments, server 752 can include a processor 812, a display 814, one or more inputs 816, one or more communications systems 818, and/or memory 820. In some embodiments, processor 812 can be any suitable hardware processor or combination of processors, such as a CPU, a GPU, and so on. In some embodiments, display 814 can include any suitable display devices, such as a computer monitor, a touchscreen, a television, and so on. In some embodiments, inputs 816 can include any suitable input devices and/or sensors that can be used to receive user input, such as a keyboard, a mouse, a touchscreen, a microphone, and so on.

In some embodiments, communications systems 818 can include any suitable hardware, firmware, and/or software for communicating information over communication network 754 and/or any other suitable communication networks. For example, communications systems 818 can include one or more transceivers, one or more communication chips and/or chip sets, and so on. In a more particular example, communications systems 818 can include hardware, firmware and/or software that can be used to establish a Wi-Fi connection, a Bluetooth connection, a cellular connection, an Ethernet connection, and so on.

In some embodiments, memory 820 can include any suitable storage device or devices that can be used to store instructions, values, data, or the like, that can be used, for example, by processor 812 to present content using display 814, to communicate with one or more computing devices 750, and so on. Memory 820 can include any suitable volatile memory, non-volatile memory, storage, or any suitable combination thereof. For example, memory 820 can include RAM, ROM, EEPROM, one or more flash drives, one or more hard disks, one or more solid state drives, one or more optical drives, and so on. In some embodiments, memory 820 can have encoded thereon a server program for controlling operation of server 752. In such embodiments, processor 812 can execute at least a portion of the server program to transmit information and/or content (e.g., data, images, a user interface) to one or more computing devices 750, receive information and/or content from one or more computing devices 750, receive instructions from one or more devices (e.g., a personal computer, a laptop computer, a tablet computer, a smartphone), and so on.

In some embodiments, ultrasound data source 702 can include a processor 822, one or more image acquisition systems 824, one or more communications systems 826, and/or memory 828. In some embodiments, processor 822 can be any suitable hardware processor or combination of processors, such as a CPU, a GPU, and so on. In some embodiments, the one or more image acquisition systems 824 are generally configured to acquire data, images, or both, and can include an ultrasound transducer. Additionally or alternatively, in some embodiments, one or more image acquisition systems 824 can include any suitable hardware, firmware, and/or software for coupling to and/or controlling operations of an ultrasound transducer. In some embodiments, one or more portions of the one or more image acquisition systems 824 can be removable and/or replaceable.

Note that, although not shown, ultrasound data source 702 can include any suitable inputs and/or outputs. For example, ultrasound data source 702 can include input devices and/or sensors that can be used to receive user input, such as a keyboard, a mouse, a touchscreen, a microphone, a trackpad, a trackball, and so on. As another example, ultrasound data source 702 can include any suitable display devices, such as a computer monitor, a touchscreen, a television, etc., one or more speakers, and so on.

In some embodiments, communications systems 826 can include any suitable hardware, firmware, and/or software for communicating information to computing device 750 (and, in some embodiments, over communication network 754 and/or any other suitable communication networks). For example, communications systems 826 can include one or more transceivers, one or more communication chips and/or chip sets, and so on. In a more particular example, communications systems 826 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 828 can include any suitable storage device or devices that can be used to store instructions, values, data, or the like, that can be used, for example, by processor 822 to control the one or more image acquisition systems 824, and/or receive data from the one or more image acquisition systems 824; to images from data; present content (e.g., images, a user interface) using a display; communicate with one or more computing devices 750; and so on. Memory 828 can include any suitable volatile memory, non-volatile memory, storage, or any suitable combination thereof. For example, memory 828 can include RAM, ROM, EEPROM, one or more flash drives, one or more hard disks, one or more solid state drives, one or more optical drives, and so on. In some embodiments, memory 828 can have encoded thereon, or otherwise stored therein, a program for controlling operation of ultrasound data source 702. In such embodiments, processor 822 can execute at least a portion of the program to generate images, transmit information and/or content (e.g., data, images) to one or more computing devices 750, receive information and/or content from one or more computing devices 750, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for generating quantitative vessel feature data from non-contrast ultrasound data, the steps of the method comprising:
   (a) providing a microvasculature image to a computer system, the microvasculature image having been acquired with an ultrasound system from a subject without a contrast agent;
   (b) preprocessing the microvasculature image by applying, with the computer system, a vessel enhancement filter to the microvasculature image to penalize background noise while selectively amplifying at least one local intensity profile associated with vessel structures in the microvasculature image;
   (c) converting the preprocessed microvasculature image to a binary image using the computer system;
   (d) generating vessel segment data from the binary image by morphologically filtering the binary image using the computer system, wherein the vessel segment data represent segmented vessels depicted in the microvasculature image, wherein the vessel segment data are further processed to remove randomly distributed patterns;
   (e) generating quantitative vessel feature data from the vessel segment data, the quantitative vessel feature data comprising at least one of quantitative vessel structure data, quantitative vessel diameter data, or quantitative vessel tortuosity data; and
   (f) generating with the computer system a graphical user interface and displaying the quantitative vessel feature data to a user in connection with the graphical user interface.

2. The method as recited in claim 1, wherein the vessel segment data comprise a binary image whose non-zero pixel values correspond to segmented vessels.

3. The method as recited in claim 1, wherein the morphological filtering comprises a thinning algorithm applied to the binary image, generating output as a skeletonized binary image from which the quantitative vessel feature data are generated in step (e).

4. The method as recited in claim 3, wherein the skeletonized binary image is further processed to label connected components in the skeletonized binary image.

5. The method as recited in claim 3, wherein the skeletonized binary image is further processed to remove groups of pixels associated with small vessels from the skeletonized binary image.

6. The method as recited in claim 5, wherein removing groups of pixels associated with small vessels from the skeletonized binary image comprises removing groups of pixels with a length less than a threshold length value.

7. The method as recited in claim 5, wherein removing groups of pixels associated with small vessels from the skeletonized binary image comprises removing groups of pixels with a diameter less than a threshold diameter value.

8. The method as recited in claim 1, wherein the quantitative vessel feature data comprise vessel structure data indicative of at least one of a number of vessels depicted in the microvasculature image, lengths of vessels depicted in the microvasculature image, a density of vessels depicted in the microvasculature image, a number of branch points depicted in the microvasculature image, or combinations thereof.

9. The method as recited in claim 1, wherein the quantitative vessel feature data comprise vessel diameter data, and wherein the vessel diameter data are generated for each pixel in the vessel segment data corresponding to segmented vessels by:
   computing a distance between that pixel and a nearest non-vessel pixel in the vessel segment data;
   assigning twice the distance to the pixel as a vessel diameter value for that pixel.

10. The method as recited in claim 9, wherein the vessel diameter data comprise a vessel diameter map that depicts centerlines of vessels in the microvasculature image and wherein pixels on the centerlines are assigned vessel diameter values for those locations on the centerlines.

11. The method as recited in claim 1, wherein the quantitative vessel feature data comprise vessel tortuosity data indicating a distance metric (DM) that represents a ratio between an actual path length of a meandering curve and a linear distance between endpoints.

12. The method as recited in claim 1, wherein the quantitative vessel feature data comprise vessel tortuosity data indicating an inflection count metric.

13. The method as recited in claim 1, wherein the quantitative vessel feature data comprise vessel tortuosity data indicating a sum-of-angle metric.

14. The method as recited in claim 1, wherein the vessel segment data are processed to remove vessel segments that do not satisfy an amplitude of vessel segment condition, a diameter of vessel segment condition, or a length of vessel segment condition.

15. The method as recited in claim 1, wherein the vessel segment data are processed to remove randomly distributed patterns using a morphology filter based on thresholding of vessel segment length and vessel segment diameter.

16. The method as recited in claim 1, wherein the microvasculature image was acquired with a three-dimensional ultrasound imaging system.

17. The method as recited in claim 16, wherein the three-dimensional ultrasound imaging system implements three-dimensional imaging by one of mechanical motion of a two-dimensional system or matrix arrays to form three dimensional images.

18. The method as recited in claim 1, wherein the microvasculature image is a three-dimensional image, and wherein the vessel feature data are three-dimensional vessel feature data.

19. A method for generating quantitative vessel feature data from non-contrast ultrasound data, the steps of the method comprising:

(a) providing a microvasculature image to a computer system, the microvasculature image having been acquired with an ultrasound system from a subject without a contrast agent;

(b) converting the microvasculature image to a binary image using the computer system, (c) generating vessel segment data from the binary image by morphologically filtering the binary image using the computer system, wherein the vessel segment data represent segmented vessels depicted in the microvasculature image;

(d) generating quantitative vessel feature data from the vessel segment data, the quantitative vessel feature data comprising at least one of quantitative vessel structure data, quantitative vessel diameter data, or quantitative vessel tortuosity data;

(e) generating with the computer system a graphical user interface and displaying the quantitative vessel feature data to a user in connection with the graphical user interface; and wherein the vessel segment data are processed to remove randomly distributed patterns using a morphology filter based on thresholding of vessel segment length and vessel segment diameter.

* * * * *

UNITED STATES PATENT AND TRADEMARK OFFICE
CERTIFICATE OF CORRECTION

PATENT NO. : 12,315,141 B2  
APPLICATION NO. : 17/299907  
DATED : May 27, 2025  
INVENTOR(S) : Azra Alizad et al.

Page 1 of 1

It is certified that error appears in the above-identified patent and that said Letters Patent is hereby corrected as shown below:

In the Specification

Column 5, Line 25, "THE" should be --THF--.

Column 11, Line 60, "$A_j := [\alpha_{2j}, \ldots, \alpha_{Nj-1,j}]_{3\times(N_j-2)}$" should be --$A_j := [a_{2j}, \ldots, a_{Nj-1,j}]_{3\times(N_j-2)}$--.

Column 11, Line 65, "$\alpha_{kj} = d^{(2)}_{kj} - d^{(1)}_{kj}$" should be --$a_{kj} = d^{(2)}_{kj} - d^{(1)}_{kj}$--.

Column 12, Line 5, "$n_{kj} = \frac{v_{kj} \times \alpha_{kj} \times v_{kj}}{|v_{kj} \times \alpha_{kj} \times v_{kj}|}$" should be --$n_{kj} = \frac{v_{kj} \times a_{kj} \times v_{kj}}{|v_{kj} \times a_{kj} \times v_{kj}|}$--.

Column 13, Line 7, "PR(V$_i$=1):= p" should be --PR(V$_i$=1):=p$_i$--.

Column 14, Line 7, "$\Pr(D_{\min} < D_i \leq D_{\max}) \stackrel{\bar{D}_{\min}>0}{=} p_1 \Pr(D_{\min} < D \leq D_{\max} | V_i = 1)$" should be --$\Pr(\bar{D}_{\min} < D_i \leq \bar{D}_{\max}) \stackrel{\bar{D}_{\min}>0}{=} p_1 \Pr(\bar{D}_{\min} < D \leq \bar{D}_{\max} | V_i = 1)$--.

Column 14, Line 9, "Pr(D$_i$ ≥ D$_{min}$) = $p_1$ Pr(D$_{min}$ < D ≤ D$_{max}$ |V$_i$ = 1)" should be --Pr(D$_i$ ≥ $\bar{D}_{min}$) = $p_1$ Pr($\bar{D}_{min}$ < D ≤ $\bar{D}_{max}$ |V$_i$ =1)--.

Signed and Sealed this  
Twenty-second Day of July, 2025

Coke Morgan Stewart  
*Acting Director of the United States Patent and Trademark Office*